(12) United States Patent
Watson

(10) Patent No.: US 11,458,900 B2
(45) Date of Patent: Oct. 4, 2022

(54) MULTI POSITION AUTOMATED RUNNING BOARD

(71) Applicant: Magna Exteriors Inc., Concord (CA)

(72) Inventor: Bradley E. Watson, Barrie (CA)

(73) Assignee: Magna Exteriors Inc., Concord (CA)

( * ) Notice: Subject to any disclaimer, the term of this patent is extended or adjusted under 35 U.S.C. 154(b) by 19 days.

(21) Appl. No.: 16/861,727

(22) Filed: Apr. 29, 2020

(65) Prior Publication Data

US 2020/0339039 A1    Oct. 29, 2020

Related U.S. Application Data

(60) Provisional application No. 62/840,049, filed on Apr. 29, 2019.

(51) Int. Cl.
*B60R 3/02*     (2006.01)
*B60R 3/00*     (2006.01)

(52) U.S. Cl.
CPC ............... *B60R 3/02* (2013.01); *B60R 3/002* (2013.01)

(58) Field of Classification Search
CPC ................................. B60R 3/02; B60R 3/002
See application file for complete search history.

(56) References Cited

U.S. PATENT DOCUMENTS 1,456,780 A    5/1923    Kermode
1,515,449 A    11/1924   Vose
1,542,342 A    6/1925    Doctor
1,633,427 A    6/1927    Wiese
1,701,581 A    2/1929    McWhinnie
1,982,748 A    12/1934   Lamonica et al.
2,062,026 A    11/1936   Hassel
(Continued)

FOREIGN PATENT DOCUMENTS

CA    2362976 A1    8/2000
CA    2362976 C     4/2008
(Continued)

OTHER PUBLICATIONS

International Search Report for PCT/IB2018/057194 dated Dec. 17, 2018 (3-pages).

(Continued)

*Primary Examiner* — Bryan A Evans
(74) *Attorney, Agent, or Firm* — Warn Partners, P.C.

(57) ABSTRACT

An adjustable position automated running board step for a vehicle. A step member is attached to a linkage. The linkage is operable for moving the step from a deployed to a stowed position. An adjustable lead screw linkage is provided, which allows adjustable stop points between the stowed and the deployed positions. A typical stow position stows the step in a suitable position at the rocker interface and also provides a more easily tunable lowest position. The invention includes a method whereby the step can be infinitely positioned in a predetermined range between the lowest step position and the stow position by means of electronic control. The electronic control of the "mid variable position" could be programmable by either the customer or the manufacturer. For example, there exists the opportunity to have a "his and hers" selection by a number of methods such a key fob or instrument panel selection.

18 Claims, 20 Drawing Sheets

(56) References Cited

U.S. PATENT DOCUMENTS

| | | |
|---|---|---|
| 2,206,744 A | 7/1940 | Loecher |
| 2,818,594 A | 1/1958 | Dawkins |
| 3,039,562 A | 6/1962 | Wagner |
| 3,229,993 A | 1/1966 | Riddle |
| 3,404,581 A | 10/1968 | Kraus |
| 3,608,957 A | 9/1971 | Maneck |
| 3,758,134 A | 9/1973 | Stewart |
| 3,762,742 A | 10/1973 | Bucklen |
| 3,955,827 A | 5/1976 | Wonigar |
| 3,957,284 A | 5/1976 | Wright |
| 3,986,724 A | 10/1976 | Rivinius |
| 4,020,920 A | 5/1977 | Abbott |
| 4,116,457 A * | 9/1978 | Nerem ............... B60R 3/02 280/166 |
| 4,167,272 A | 9/1979 | Wright et al. |
| 4,185,849 A | 1/1980 | Jaeger |
| 4,189,955 A | 2/1980 | Bishop |
| 4,231,583 A | 11/1980 | Learn |
| 4,356,894 A | 11/1982 | Everett |
| 4,909,700 A | 3/1990 | Fontecchio et al. |
| 4,935,638 A | 6/1990 | Straka |
| 4,943,085 A | 7/1990 | Straka |
| 5,193,829 A | 3/1993 | Holloway et al. |
| 5,195,609 A | 3/1993 | Ham et al. |
| 5,228,707 A | 7/1993 | Yoder |
| 5,265,896 A | 11/1993 | Kravitz |
| 5,501,475 A | 3/1996 | Bundy |
| 5,538,269 A | 7/1996 | McDaniel et al. |
| 5,601,300 A | 2/1997 | Fink et al. |
| 5,605,071 A | 2/1997 | Buchanan, Jr. |
| 5,697,626 A * | 12/1997 | McDaniel ............ B60R 3/02 182/91 |
| 5,806,869 A | 9/1998 | Richards |
| 5,842,709 A | 12/1998 | Maccabee |
| 5,895,064 A | 4/1999 | Laubach |
| 6,036,208 A | 3/2000 | Frerichs |
| 6,135,472 A | 10/2000 | Wilson et al. |
| 6,149,172 A | 11/2000 | Pascoe et al. |
| 6,325,397 B1 | 12/2001 | Pascoe et al. |
| 6,375,207 B1 | 4/2002 | Dean et al. |
| 6,390,343 B1 | 5/2002 | Jain |
| 6,406,045 B1 | 6/2002 | Farkash |
| 6,435,534 B1 | 8/2002 | Stone |
| 6,533,303 B1 | 3/2003 | Watson |
| 6,581,946 B2 | 6/2003 | Lund et al. |
| 6,641,158 B2 | 11/2003 | Leitner |
| 6,676,223 B2 | 1/2004 | Kolpasky |
| 6,709,137 B1 | 3/2004 | Glovak et al. |
| 6,726,230 B2 | 4/2004 | Weir |
| 6,769,527 B1 | 8/2004 | Paris |
| 6,869,092 B1 | 3/2005 | Henn |
| 6,880,843 B1 | 4/2005 | Greer, Jr. |
| 6,929,163 B1 | 8/2005 | Pedrini et al. |
| 6,938,909 B2 | 9/2005 | Leitner |
| 6,942,233 B2 | 9/2005 | Leitner et al. |
| 6,955,370 B2 | 10/2005 | Fabiano et al. |
| 6,959,937 B2 | 11/2005 | Schneider et al. |
| 6,971,657 B2 | 12/2005 | King et al. |
| 7,007,961 B2 | 3/2006 | Leitner et al. |
| 7,017,927 B2 | 3/2006 | Henderson et al. |
| 7,055,839 B2 | 6/2006 | Leitner |
| 7,070,194 B2 | 7/2006 | Garland et al. |
| 7,086,656 B2 | 8/2006 | Kolpasky et al. |
| 7,118,120 B2 | 10/2006 | Lee et al. |
| 7,163,221 B2 | 1/2007 | Leitner |
| 7,264,290 B2 | 9/2007 | Tamaya |
| 7,287,771 B2 | 10/2007 | Lee et al. |
| 7,318,596 B2 | 1/2008 | Scheuring, III et al. |
| 7,367,574 B2 | 5/2008 | Leitner |
| 7,377,531 B2 | 5/2008 | Fabiano et al. |
| 7,380,807 B2 | 6/2008 | Leitner |
| 7,398,985 B2 | 7/2008 | Leitner et al. |
| 7,413,204 B2 | 8/2008 | Leitner |
| 7,413,205 B2 | 8/2008 | Watson |
| 7,444,210 B2 | 10/2008 | Breed et al. |
| 7,469,916 B2 | 12/2008 | Watson |
| 7,513,520 B2 | 4/2009 | Okuyama |
| 7,513,565 B2 | 4/2009 | Watson |
| 7,584,975 B2 | 9/2009 | Leitner |
| 7,607,674 B2 | 10/2009 | Watson |
| 7,637,519 B2 | 12/2009 | Leitner et al. |
| 7,692,542 B2 | 4/2010 | Outzs |
| 7,823,896 B2 | 11/2010 | VanBelle et al. |
| 7,976,042 B2 | 7/2011 | Watson et al. |
| 8,136,826 B2 | 3/2012 | Watson |
| 8,157,277 B2 | 4/2012 | Leitner et al. |
| 8,240,222 B2 | 8/2012 | Yoshioka et al. |
| 8,262,113 B1 | 9/2012 | Chafey et al. |
| 8,297,635 B2 | 10/2012 | Agoncillo et al. |
| 8,342,551 B2 | 1/2013 | Watson |
| 8,602,431 B1 | 12/2013 | May |
| 8,662,512 B2 | 3/2014 | May |
| 8,668,217 B2 | 3/2014 | Ziaylek et al. |
| 8,714,575 B2 | 5/2014 | Watson |
| 8,739,342 B1 | 6/2014 | Johnson et al. |
| 8,833,781 B2 | 9/2014 | Hayes |
| 8,833,782 B2 | 9/2014 | Huotari et al. |
| 8,919,497 B2 | 12/2014 | Rund |
| 9,272,667 B2 | 3/2016 | Smith |
| 9,649,983 B2 | 5/2017 | Watson |
| 10,272,842 B2 | 4/2019 | Du et al. |
| 10,286,847 B2 | 5/2019 | Derbis |
| 10,322,677 B1 | 6/2019 | Leitner et al. |
| 10,343,610 B2 | 7/2019 | Long et al. |
| 10,377,313 B1 | 8/2019 | Brunner et al. |
| 10,399,500 B2 | 9/2019 | Hayes |
| 10,919,453 B2 | 2/2021 | Watson |
| 11,208,045 B2 | 12/2021 | Watson |
| 2003/0094781 A1 | 5/2003 | Jaramillo et al. |
| 2003/0132595 A1 | 7/2003 | Fabiano et al. |
| 2003/0178805 A1 | 9/2003 | Elrod |
| 2003/0184039 A1 | 10/2003 | Schumacher |
| 2003/0222423 A1 | 12/2003 | Weir |
| 2004/0004339 A1 | 1/2004 | Fichter |
| 2004/0070163 A1 | 4/2004 | Schneider et al. |
| 2004/0084868 A1 | 5/2004 | Leitner et al. |
| 2004/0100063 A1 | 5/2004 | Henderson et al. |
| 2004/0173987 A1 | 9/2004 | Chapman et al. |
| 2004/0174043 A1 | 9/2004 | Bradsen et al. |
| 2005/0012295 A1 | 1/2005 | Chevalier et al. |
| 2005/0062252 A1 | 3/2005 | Vincent |
| 2005/0087950 A1 | 4/2005 | Draper et al. |
| 2005/0127635 A1 | 6/2005 | Fichter |
| 2005/0151340 A1 | 7/2005 | Leitner |
| 2005/0179226 A1 | 8/2005 | Kolpasky et al. |
| 2006/0254376 A1 | 11/2006 | Ota et al. |
| 2007/0085376 A1 | 4/2007 | Kuntze et al. |
| 2007/0126201 A1 | 6/2007 | Crandall |
| 2007/0138757 A1 | 6/2007 | Kuntze et al. |
| 2007/0159308 A1 | 7/2007 | Johnston |
| 2007/0194916 A1 | 8/2007 | Hewitt et al. |
| 2007/0267842 A1 | 11/2007 | Seibert et al. |
| 2008/0106058 A1 | 5/2008 | Demick |
| 2008/0271936 A1 | 11/2008 | Kuntze et al. |
| 2011/0226558 A1 | 9/2011 | Fravel et al. |
| 2012/0098231 A1 | 4/2012 | Huotar et al. |
| 2012/0104719 A1 | 5/2012 | Hayes |
| 2015/0094877 A1 | 4/2015 | Tahnoose et al. |
| 2015/0123374 A1 | 5/2015 | Smith |
| 2016/0023609 A1 | 1/2016 | Watson |
| 2016/0339844 A1 | 11/2016 | Pribisic |
| 2017/0200335 A1 | 7/2017 | Da Deppo et al. |
| 2017/0210299 A1 * | 7/2017 | Watson ............... B60R 3/02 |
| 2018/0297530 A1 | 10/2018 | Stickles et al. |
| 2021/0129759 A1 | 5/2021 | Watson |
| 2022/0097609 A1 | 3/2022 | Watson |

FOREIGN PATENT DOCUMENTS

| | | |
|---|---|---|
| CN | 1209691 A | 3/1999 |
| CN | 1652955 A | 8/2005 |
| CN | 102424021 A | 4/2012 |
| CN | 103158623 A | 6/2013 |
| CN | 203601134 U | 5/2014 |

(56) References Cited

FOREIGN PATENT DOCUMENTS

| DE | 1064364 B     | 8/1959  |
|----|---------------|---------|
| EP | 2216202 A1    | 8/2010  |
| JP | 2008222183 A  | 9/2008  |
| JP | 2016188031 A  | 11/2016 |
| JP | 2016188044 A  | 11/2016 |
| WO | 2000050262 A1 | 8/2000  |

OTHER PUBLICATIONS

European Search Report for Application No. EP 18 19 4184 dated May 7, 2019 (1-page).
European Extended Search Report for Application No. EP 18 78 5238 dated Mar. 19, 2020 (2-pages).
U.S. Appl. No. 17/145,977, filed Jan. 11, 2021.
U.S. Appl. No. 17/426,396, filed Jul. 28, 2021.

* cited by examiner

MULTI POSITION AUTOMATED RUNNING BOARD

FIELD OF THE INVENTION

The present invention relates to multi position automated running board.

BACKGROUND OF THE INVENTION

Automated power running boards in use today have only two positions (stow and deployed). Even these can be challenging for people who are very tall or short to provide safe and effortless ingress and egress from their vehicle.

The objective is to create an automated running board design which has multiple deploy positions available to the end user, and in addition could be selectable with a user interface to the vehicle.

All existing products are designed to meet an average requirement for a deployed position height from the ground, which is vehicle specific, and in most cases the deployed position height is approximately at a midpoint between the ground and door opening or sill height. In many cases this does not suit above average tall or shorter customers so there exists an ergonomic compromise and customers do get the full benefit of an automated retractable running board.

SUMMARY OF THE INVENTION

In accordance with the present invention there is provided an adjustable position automated running board step for a vehicle. A step member is attached to a linkage. The linkage is operable for moving the step from a deployed to a stowed position. An adjustable lead screw linkage is provided, which allows adjustable stop points between the stowed and the deployed positions.

This invention has a typical stow position to suit the rocker interface and styling as well as a more easily tunable lowest position. The invention includes a method whereby the step can be infinitely positioned in a predetermined range between the lowest step position and the stow position by means of electronic control. The electronic control of the "mid variable position" could be programmable by either the customer or the manufacturer. For example, there exists the opportunity to have a "his and hers" selection by a number of methods such a key fob or instrument panel selection.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
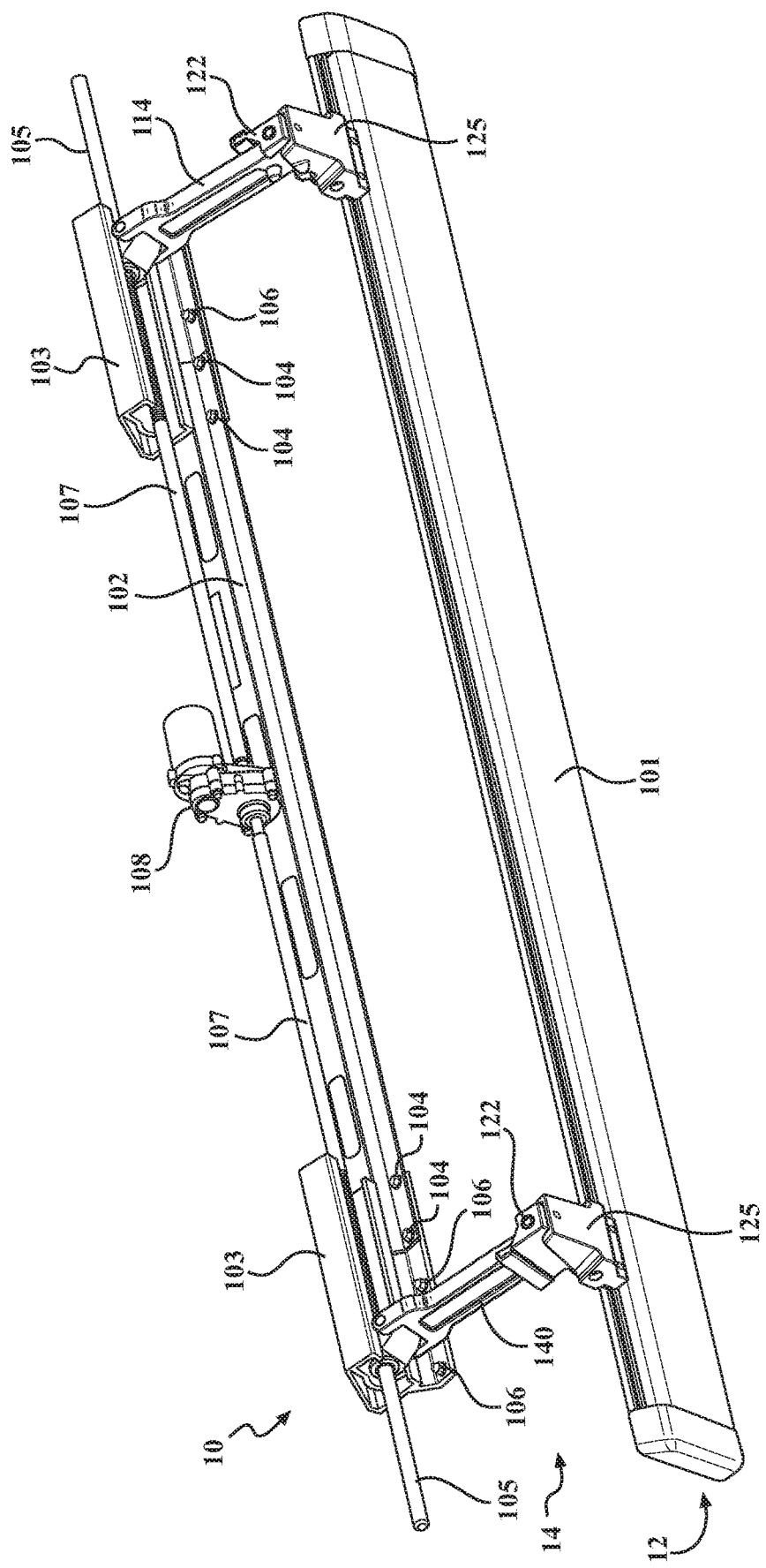
FIG. 1 Is a bottom perspective view of the adjustable position automated running board step of the present invention.
Figure 2:
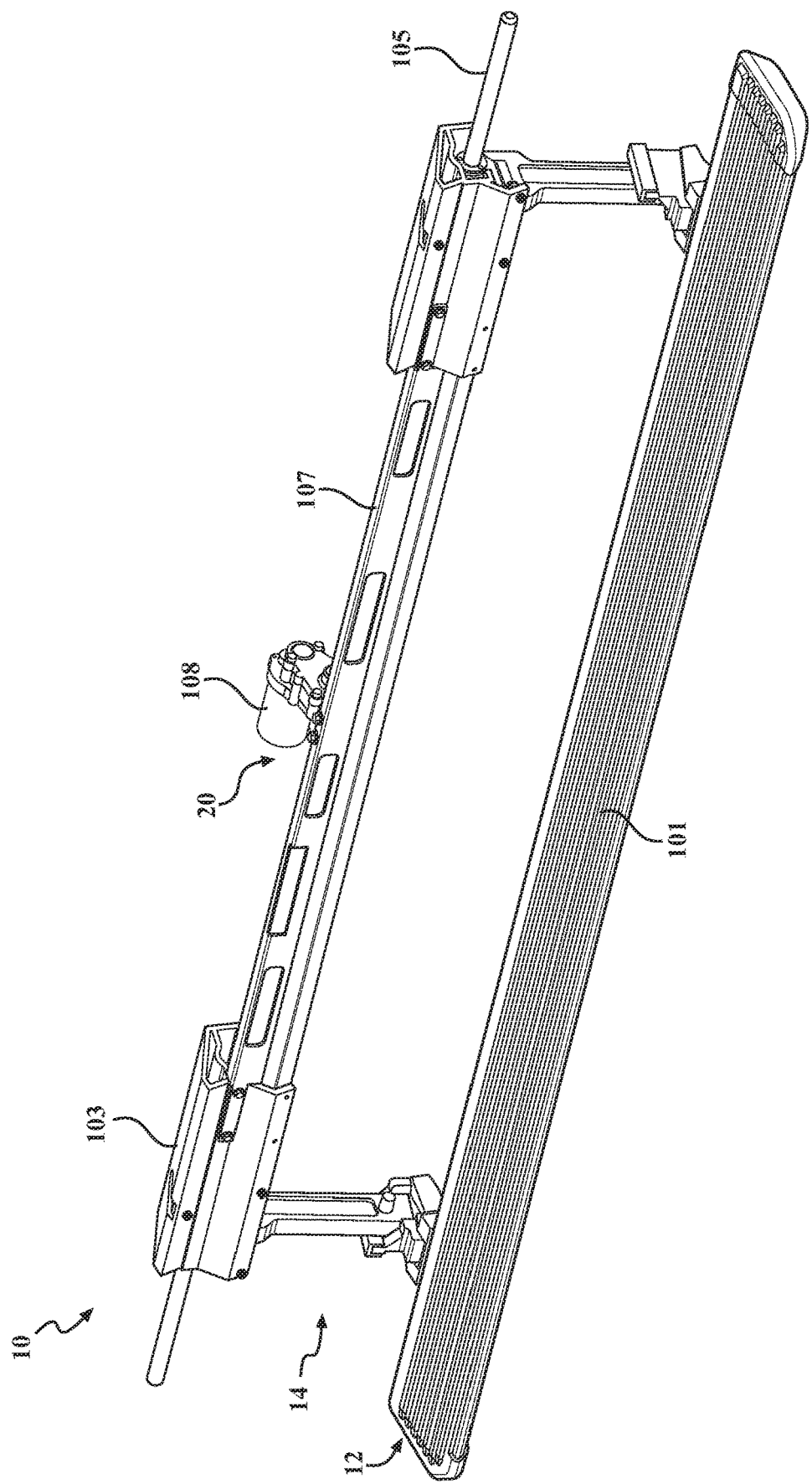
FIG. 2 is a top perspective view of the adjustable position automated running board step of the present invention.
Figure 3:
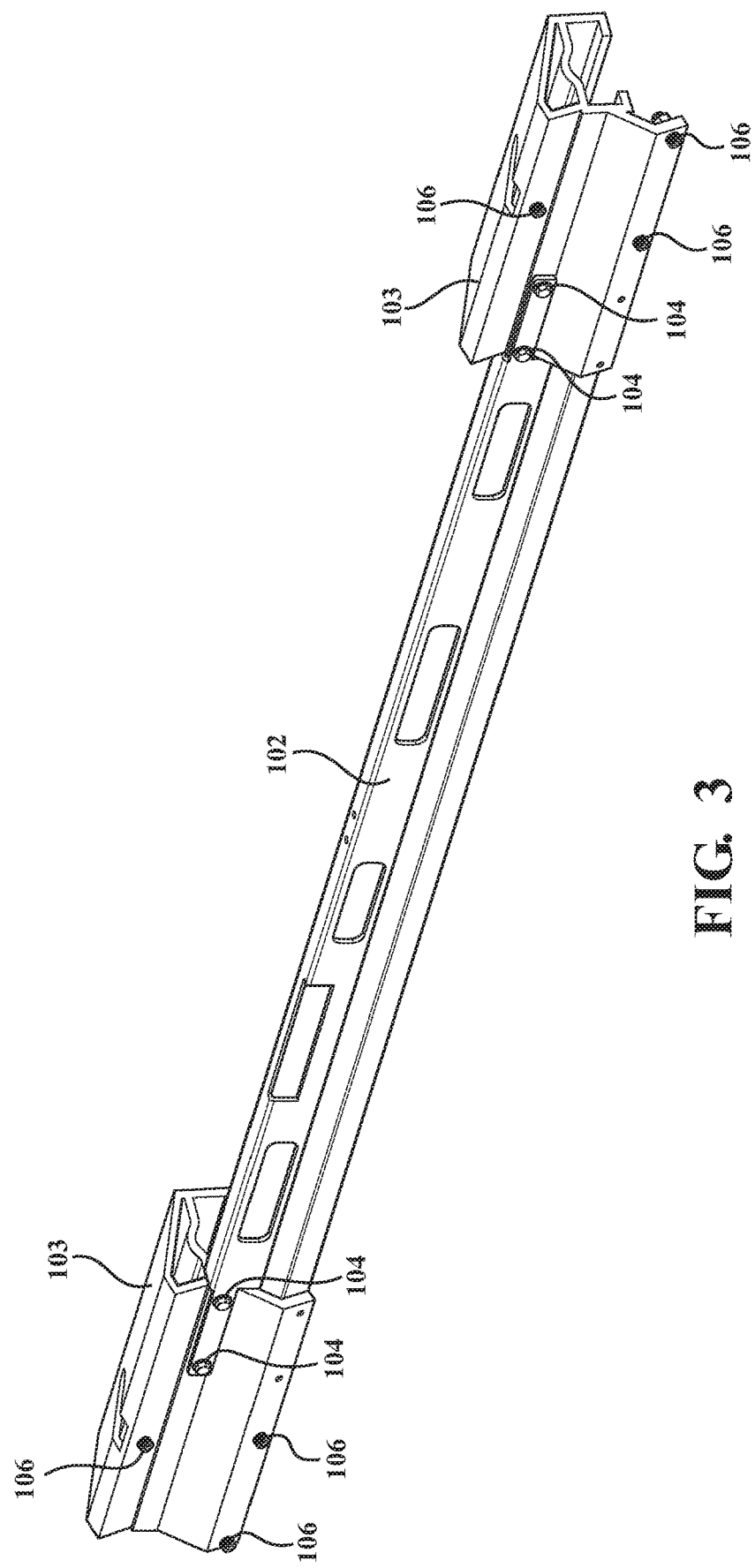
FIG. 3 is a perspective view of the mounting elements of the adjustable position automated running board step of the present invention.
Figure 4:
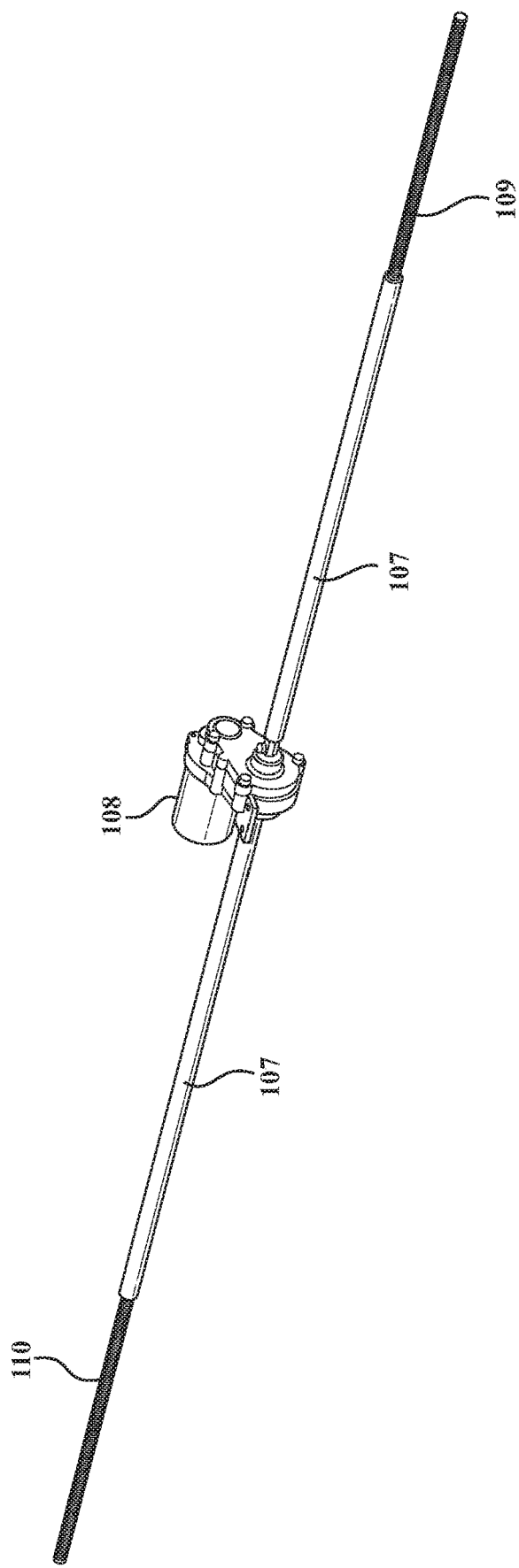
FIG. 4 is a perspective view of the drive elements of the adjustable position automated running board step of the present invention.
Figure 5:
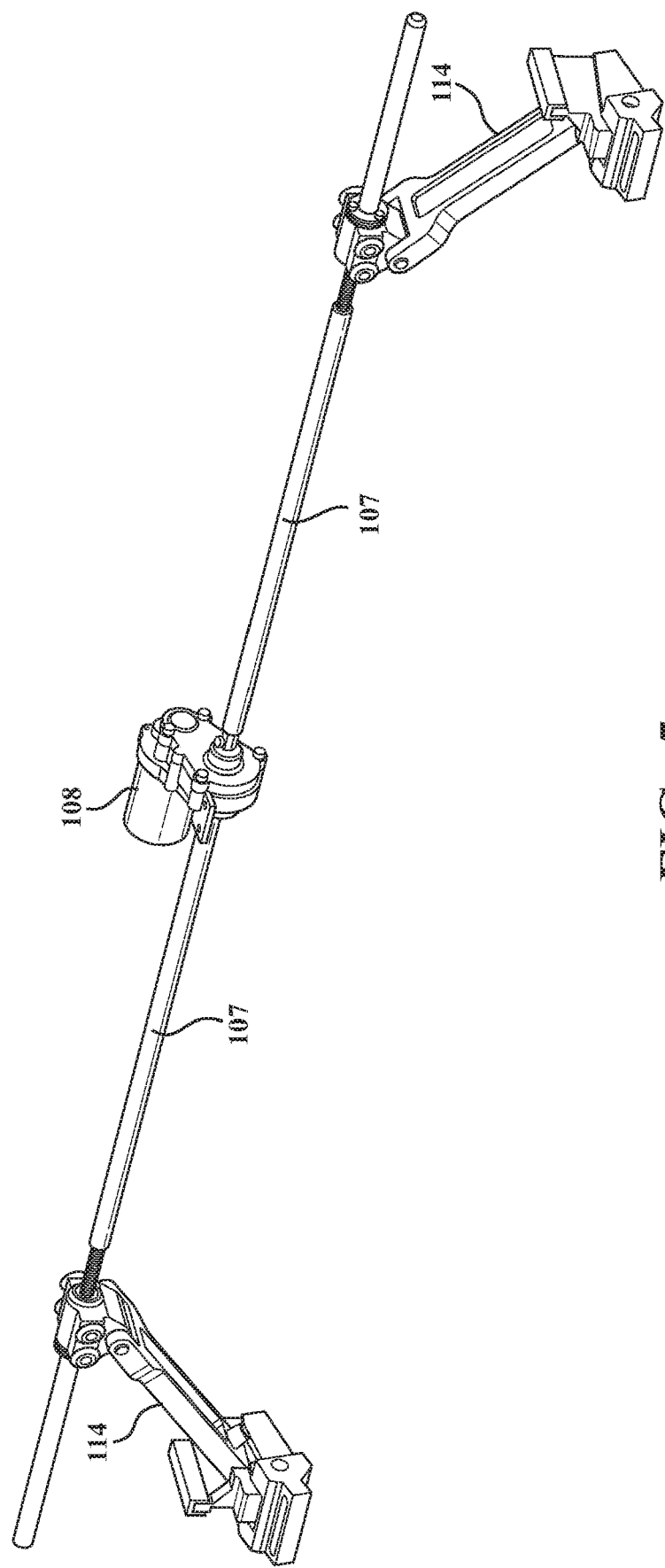
FIG. 5 is a perspective view of the drive elements showing step connection legs installed of the adjustable position automated running board step of the present invention.
Figure 6:
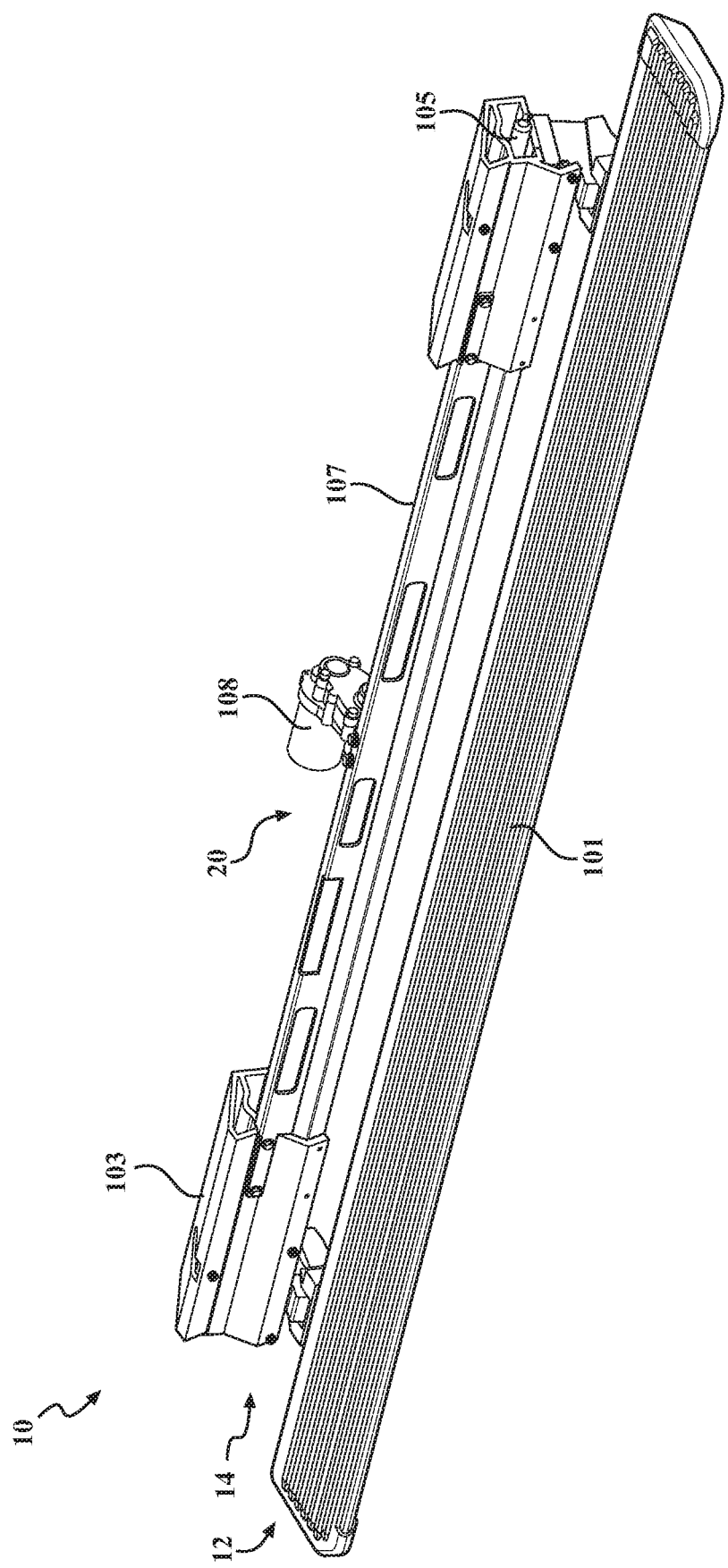
FIG. 6 is a perspective view of the adjustable position automated running board step of the present invention shown in the stowed position.
Figure 7:
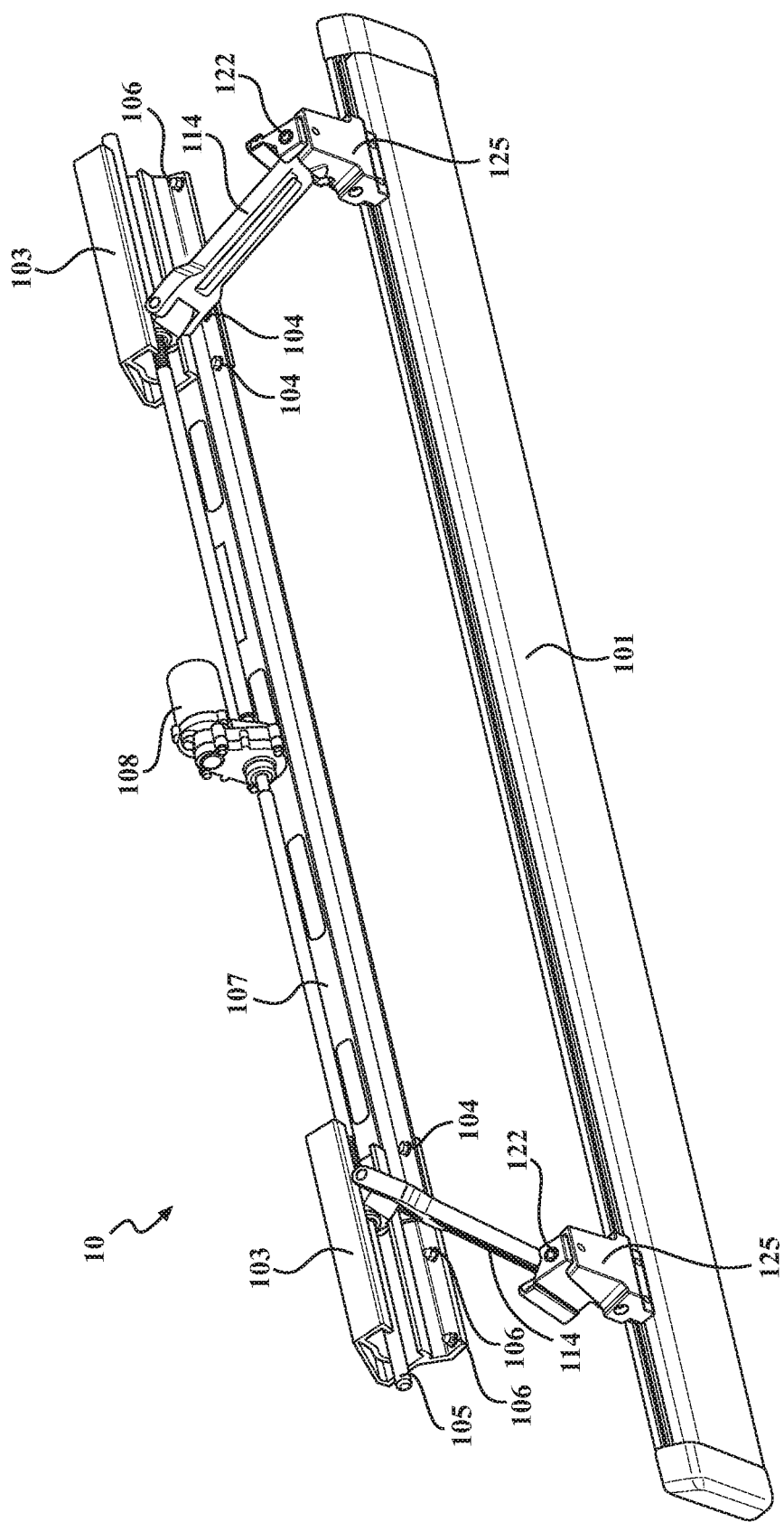
FIG. 7 is a perspective view of the adjustable position automated running board step of the present invention shown in a deployed position.
Figure 8:
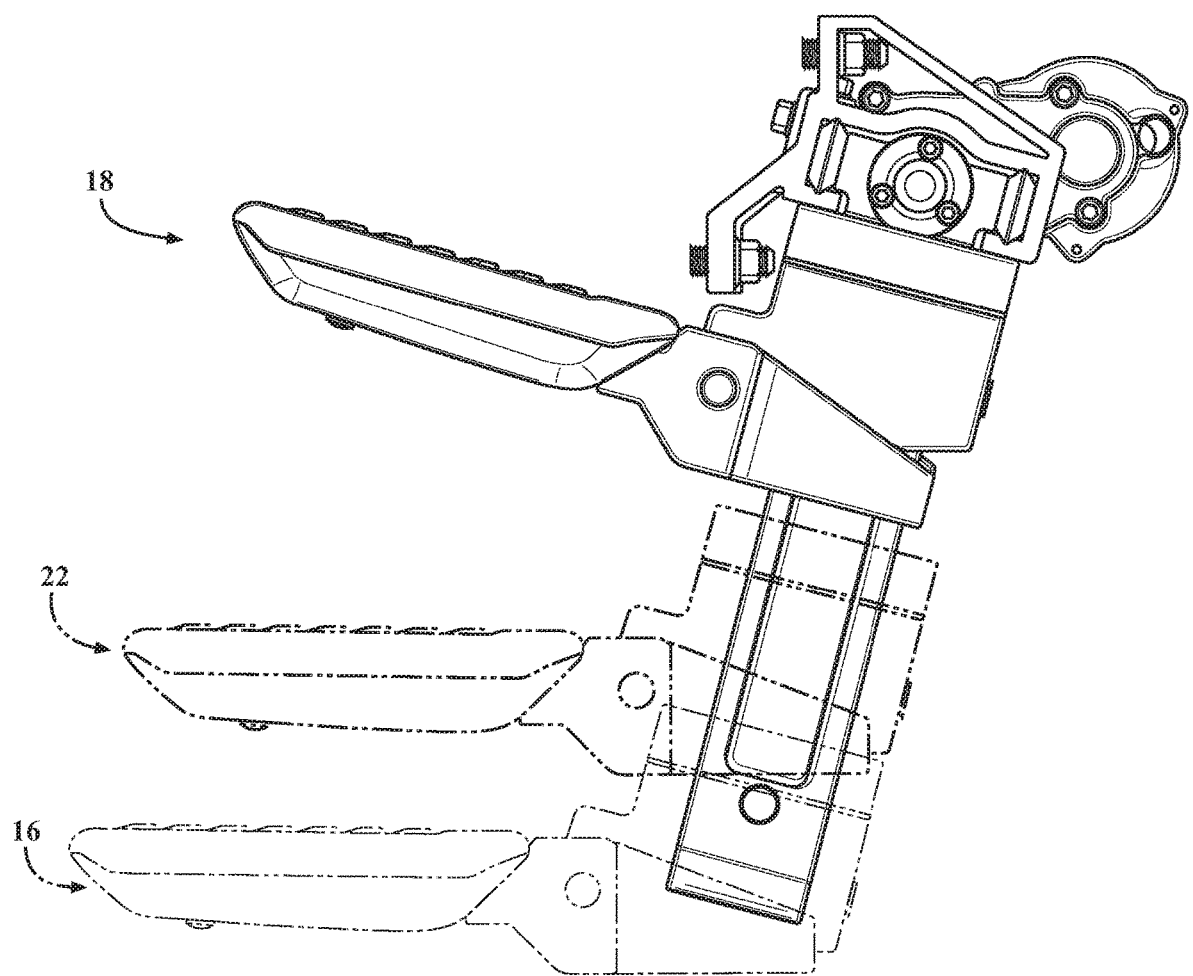
FIG. 8 is a side view showing varied positions of the step of the adjustable position automated running board step of the present invention.
Figure 9:
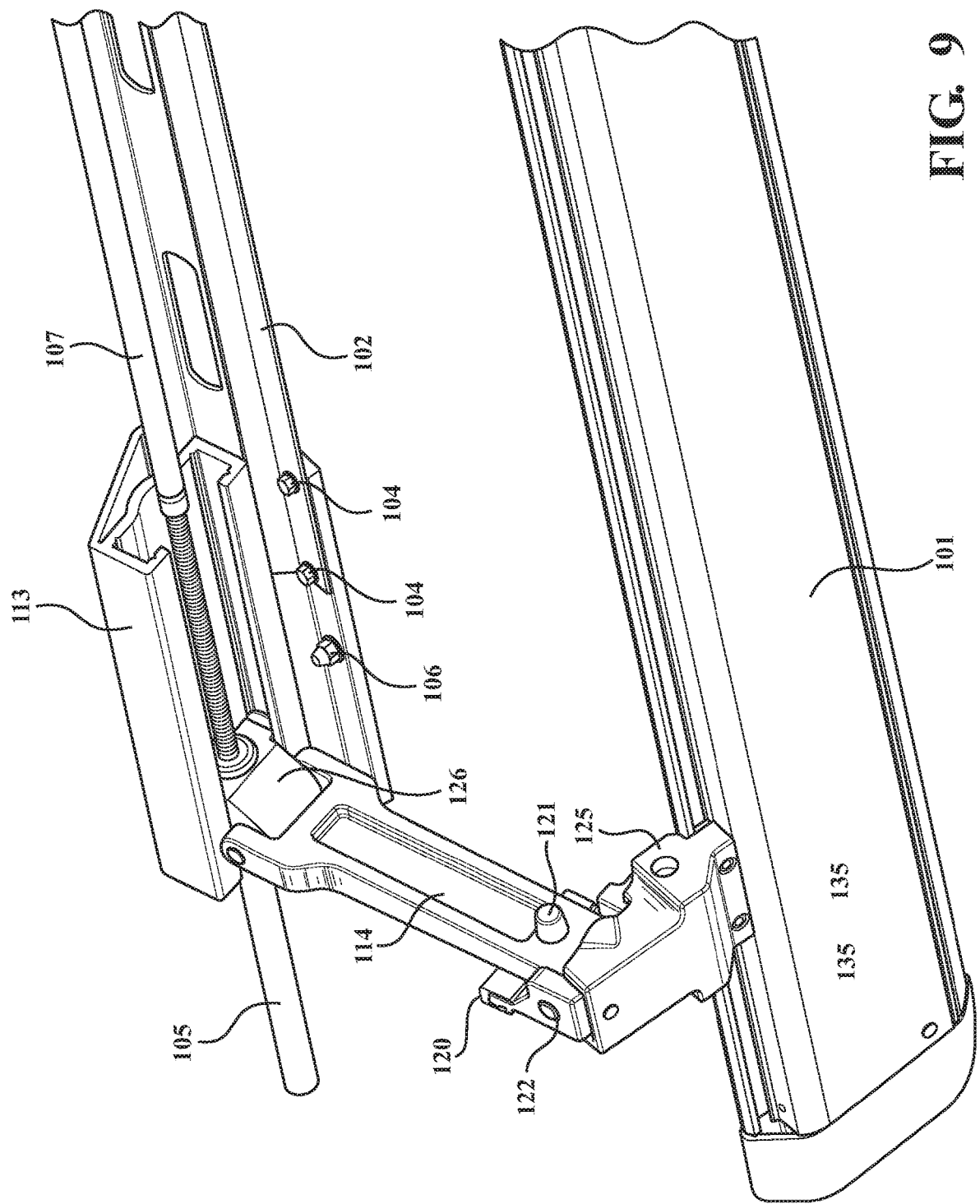
FIG. 9 is a detailed perspective view of one end of the drive members of the adjustable position automated running board step of the present invention.
Figure 10:
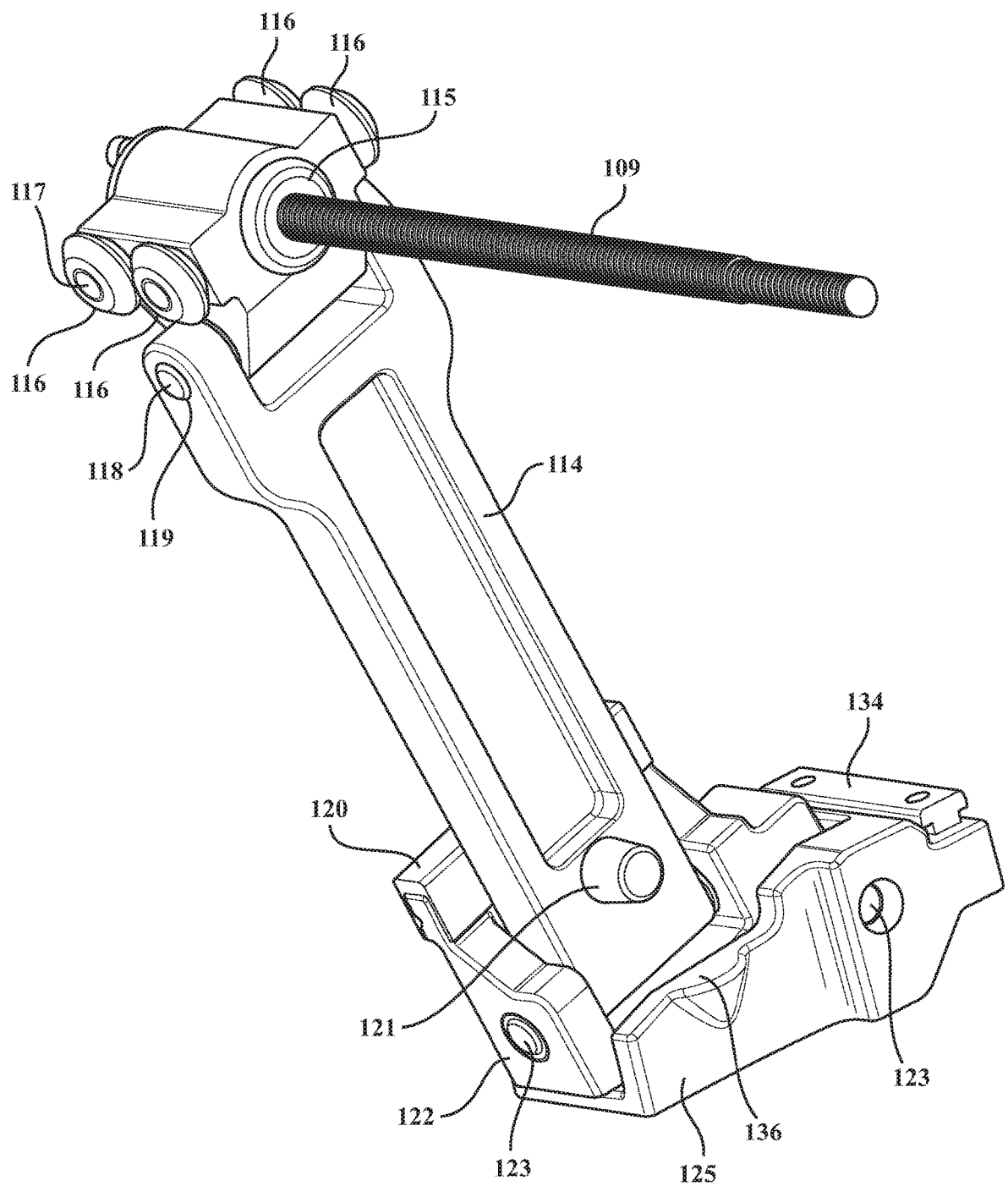
FIG. 10 is an inside detailed perspective view of the drive elements of the adjustable position automated running board step of the present invention.
Figure 11:
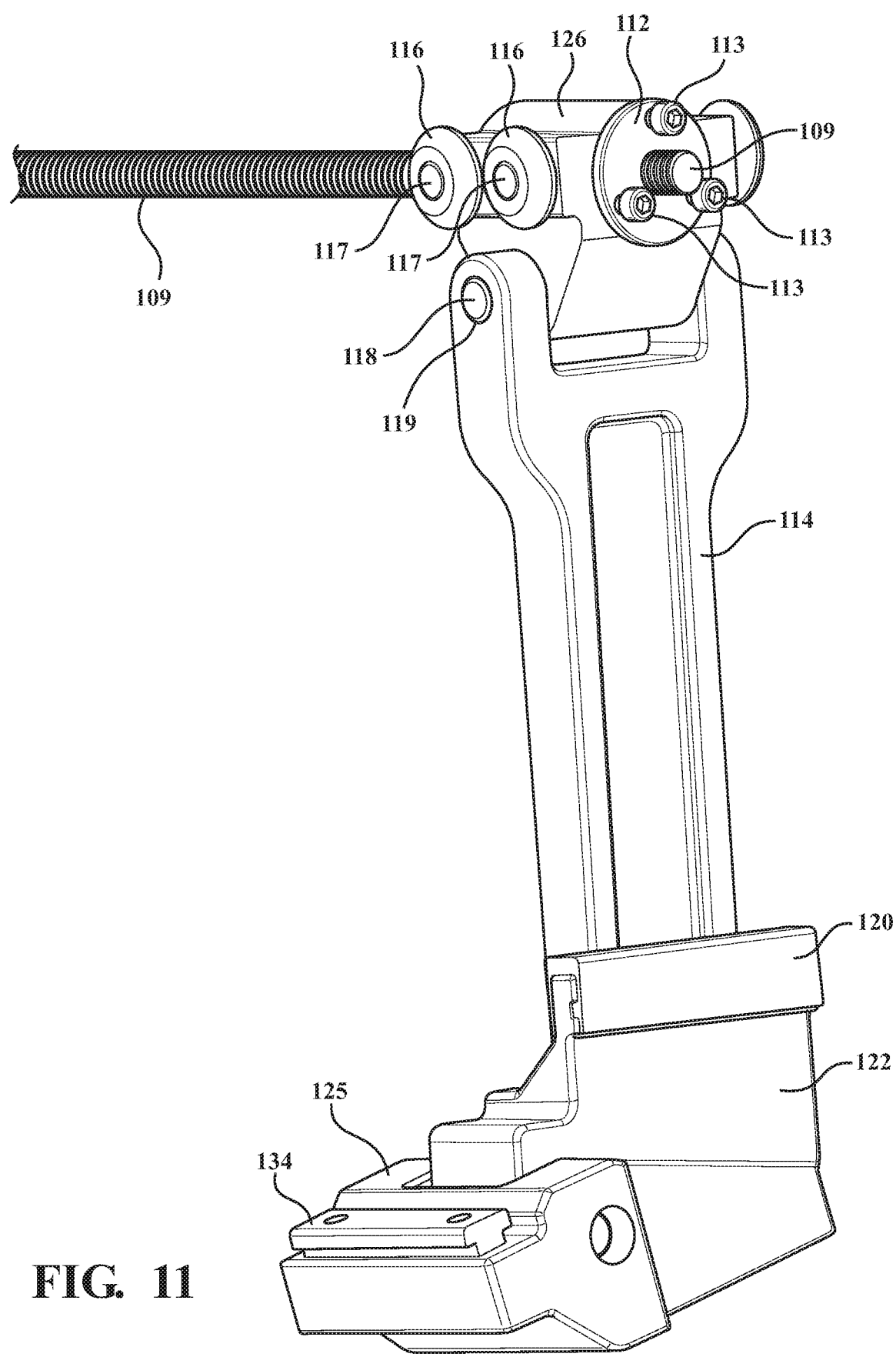
FIG. 11 is an outside perspective view of the drive elements of the adjustable position automated running board step of the present invention.
Figure 12:
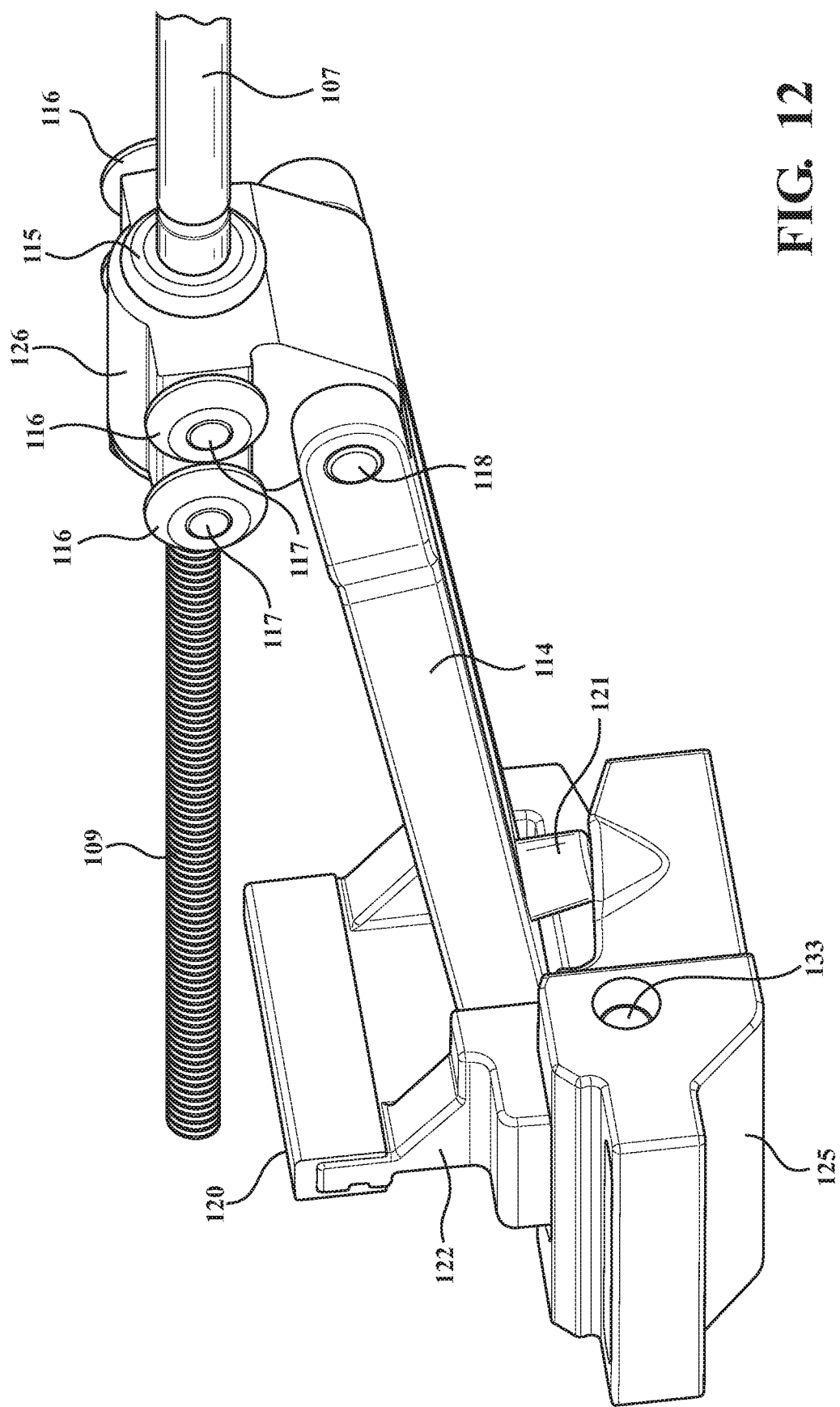
FIG. 12 is a detailed perspective view of the drive elements showing the step retracted of the adjustable position automated running board step of the present invention.
Figure 13:
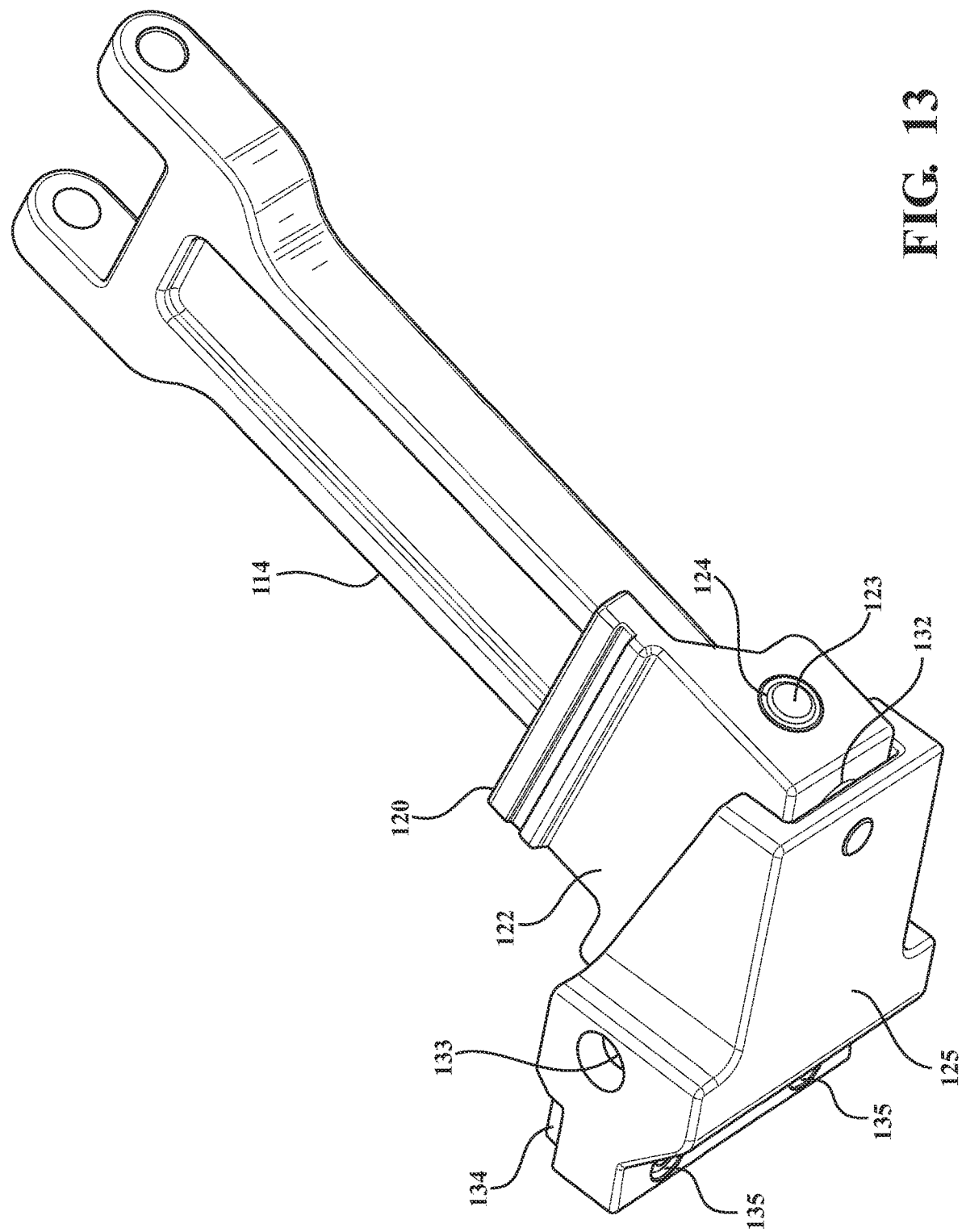
FIG. 13 is a detailed perspective view showing one of the drive leg assemblies of the adjustable position automated running board step of the present invention.
Figure 14:
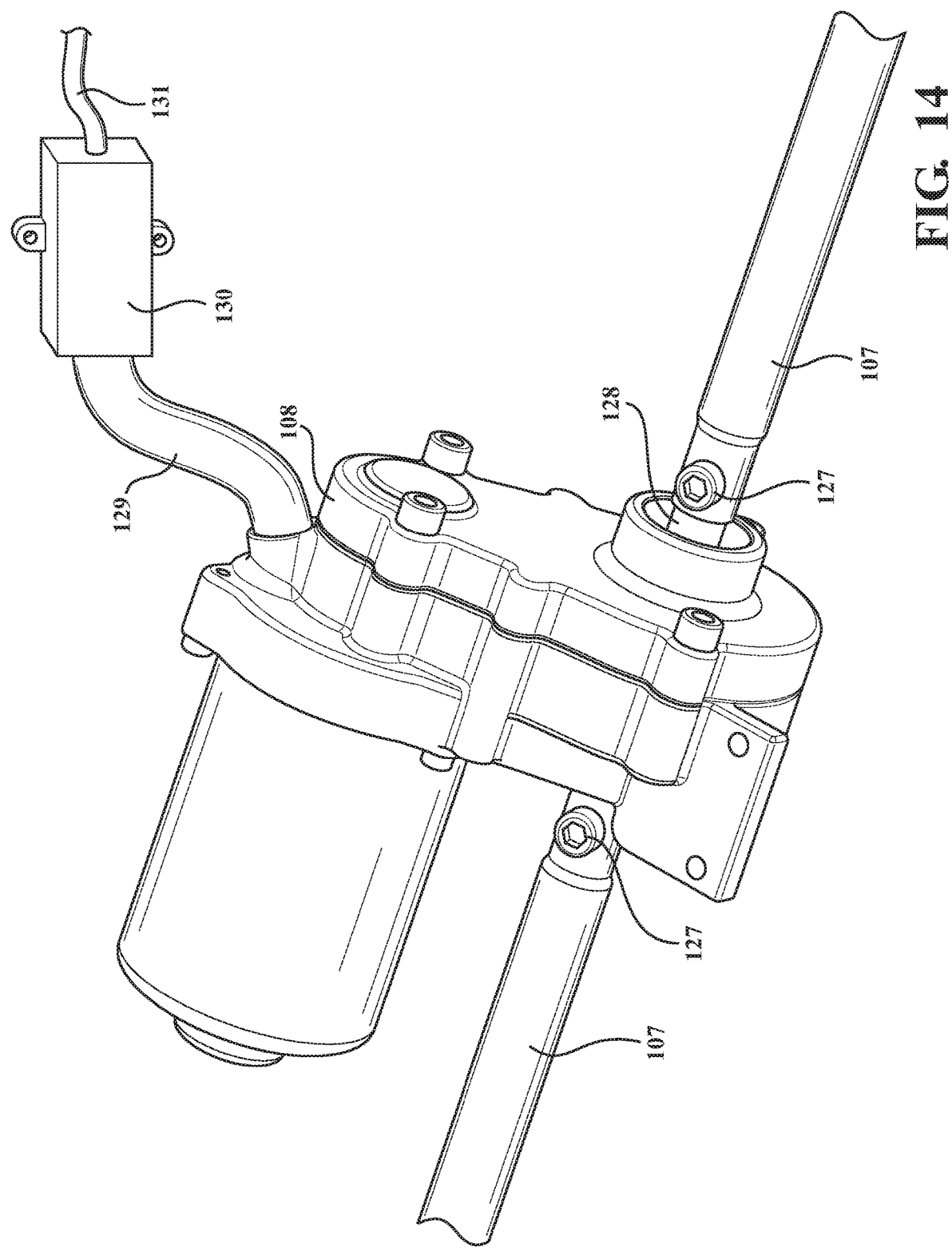
FIG. 14 is a detailed perspective view of the drive motor and controller of the adjustable position automated running board step of the present invention.
Figure 15:
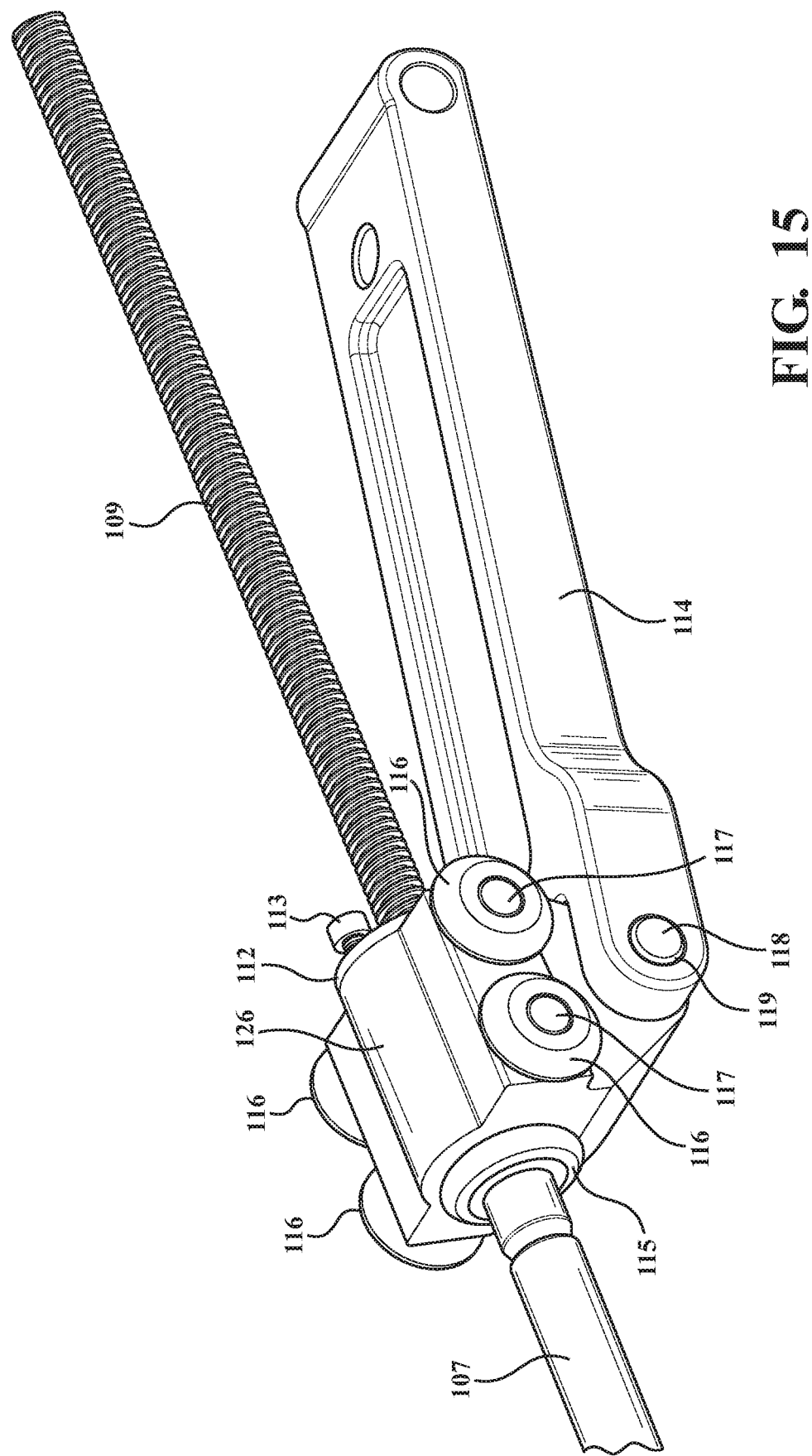
FIG. 15 is a detailed perspective view of the drive area of the adjustable position automated running board step of the present invention.
Figure 16:
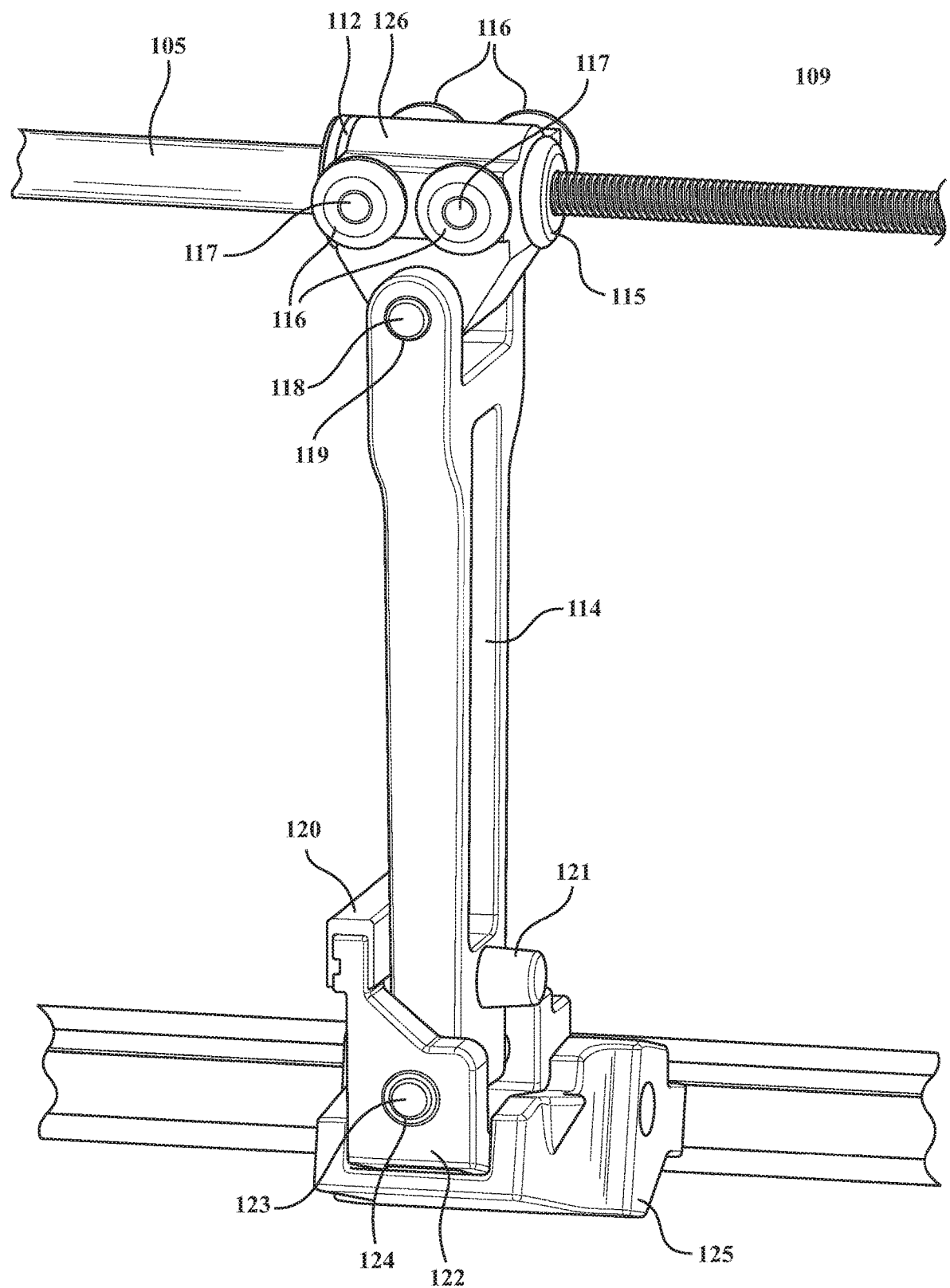
FIG. 16 is a detailed perspective view of the drive area of the adjustable position automated running board step of the present invention.
Figure 17:
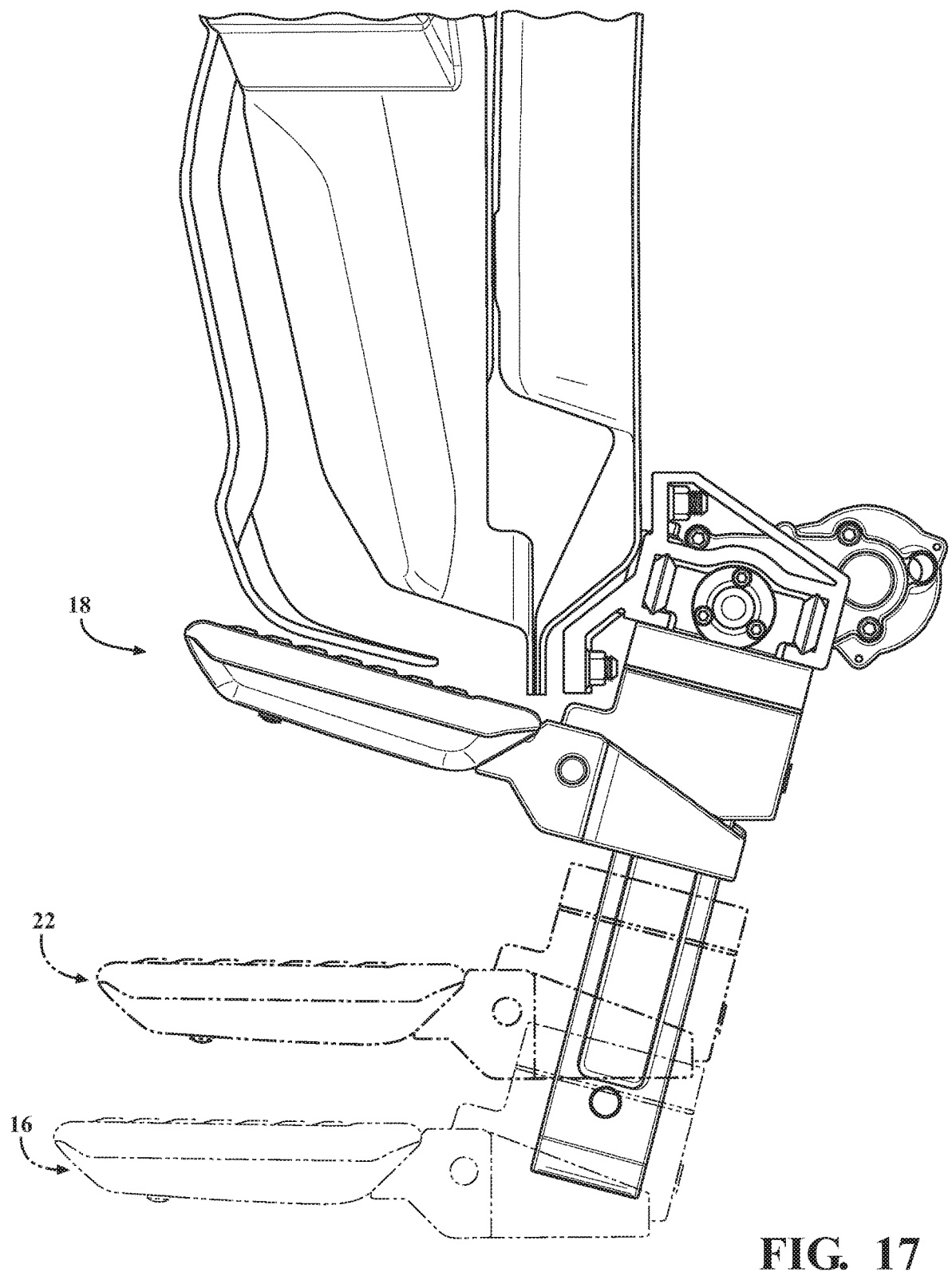
FIG. 17 is a detailed view of the step positions of the adjustable position automated running board step of the present invention.
Figure 18:
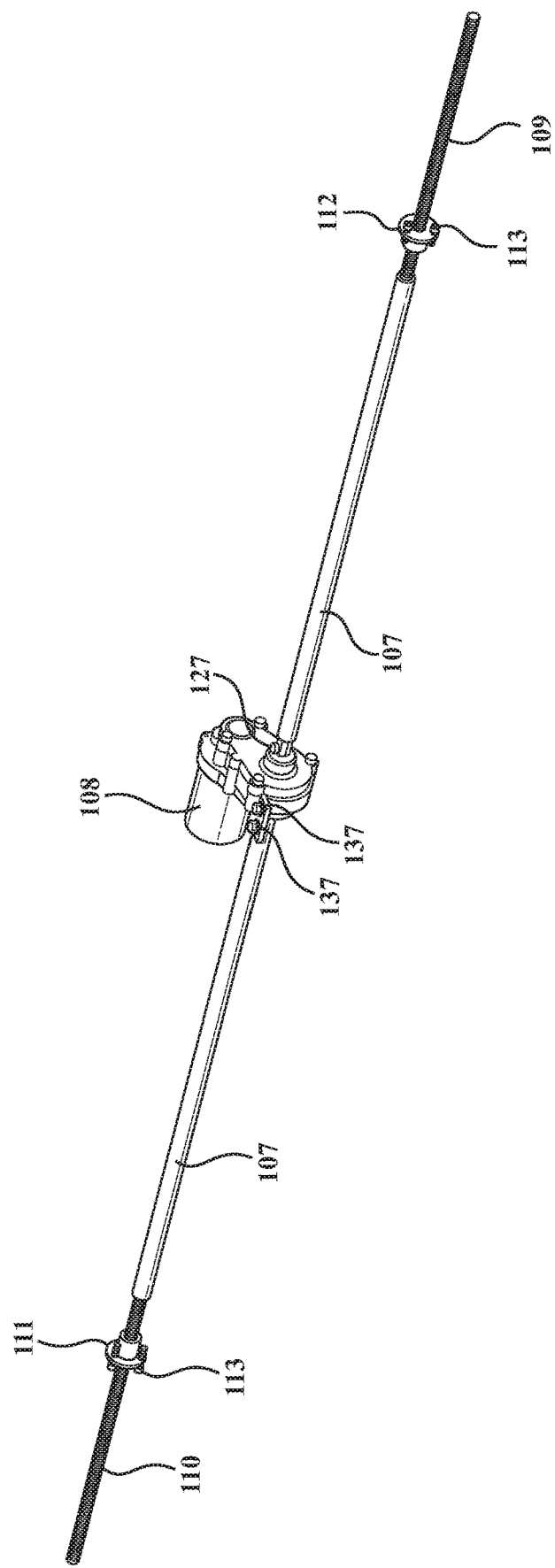
FIG. 18 is a detailed view of the drive elements of the adjustable position automated running board step of the present invention.
Figure 19:
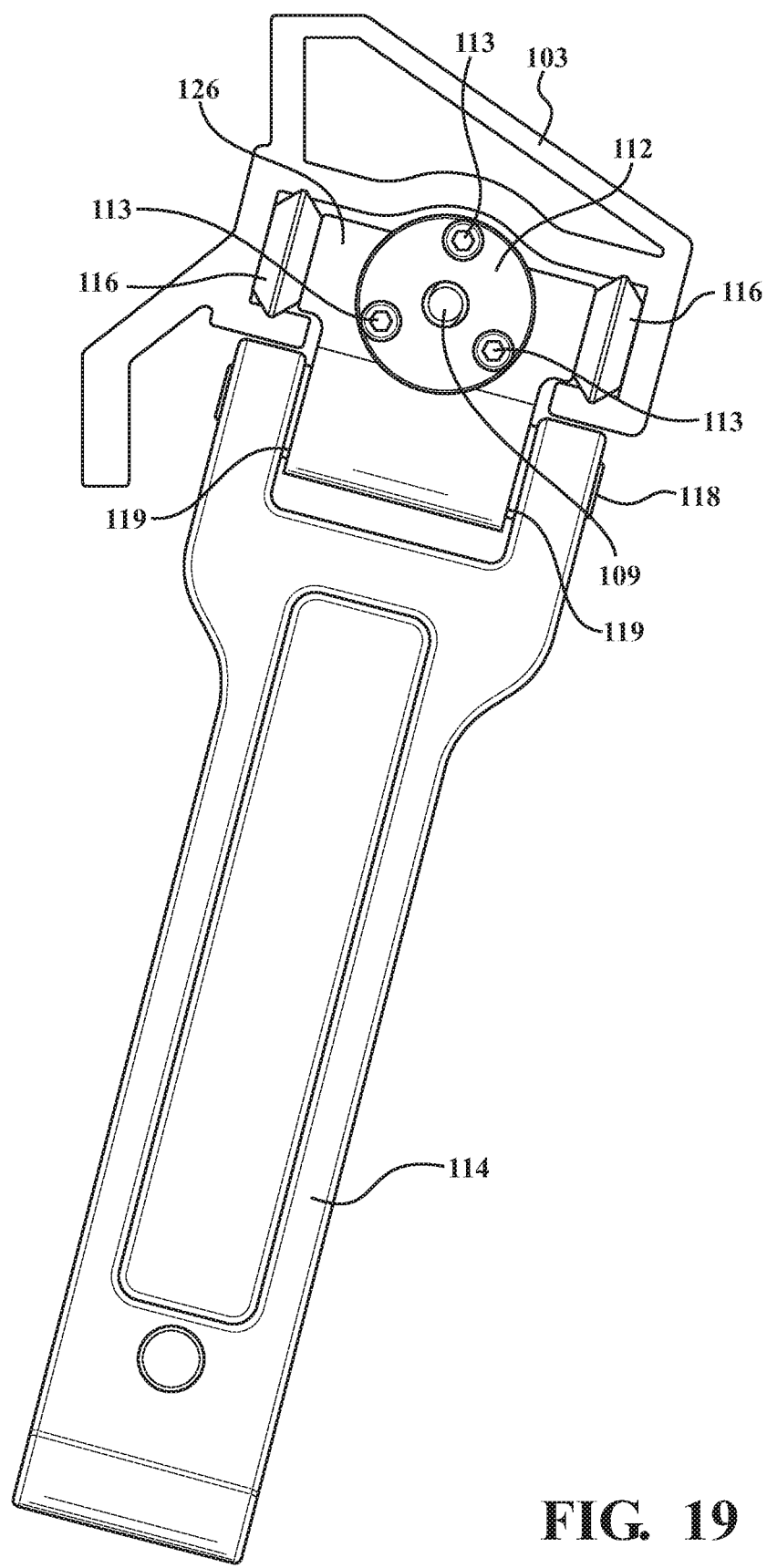
FIG. 19 is a detailed side view of the drive linkage of the adjustable position automated running board step of the present invention; and, FIG. 20 is a side view showing the drive components in the variable positions of the adjustable position automated running board step of the present invention.

The following description of the preferred embodiment(s) is merely exemplary in nature and is in no way intended to limit the invention, its application, or uses.

Referring now to the figures, an adjustable position automated running board step assembly is generally shown at 10. The step assembly 10 includes a step member generally shown at 12 attached to a linkage generally indicated at 14, the linkage 14 is operable for moving the step member 12 from a deployed 16 to a stowed 18 position. An adjustable linkage 20, such as a lead screw actuation system allows adjustable stop points between 18 stowed and said deployed 16 positions to provide at least one intermediate position 22.

This invention has a typical stow position 18 to suit the rocker interface of a vehicle and styling as well as a more easily tunable lowest deployed position 16. The invention includes a method whereby the step can be infinitely positioned in an intermediate position in a predetermined range between the lowest step position 18 and the stow position 18 by means of electronic control 130. The electronic control 130 of the "mid variable position" is programmable by either the customer or the manufacturer. For example, there exists the opportunity to have a "his and hers" selection by a number of methods such a key fob or instrument panel selection which is connected by suitable wiring or connections 131 which connects to the vehicle or a separate communications module. Additionally, the stowed and deployed positions can be preset or adjusted by the end user or manufacturer as may be necessary for assembly onto a vehicle for fit and finish or for the end user's preferences.

Attached FIGS. 1-20 show the details of the components and assemblies. The motor and drive system includes a LH 109 and RH 110 threaded lead screw that pushes or pulls a front and rear linkage assembly whose pivots form a 2D trapezoidal linkage arrangement of pivot geometry to the step as the step moves up and down along a linear path. By controlling when and where the motor stops by means of the ECM 130 which measures and records rotation counts of the motor, the step can be infinitely positioned between stow and lowest deploy positions. The slide trunnions once the motor is stopped maintain their position due to self-locking between the lead screw and lead nut such that the system is mechanically locked and cannot back drive. With the use of algorithms to control when the motor stops after it receives a signal to deploy once a door is opened or closed on the vehicle its fully tunable.

The motor 108 drives shafts 107 attached to RH and LH lead screws 109, 110 which thread into LH and RH lead nuts 111, 112. This causes slide trunnions 126 attached to lead nuts 111, 112 to move equally either moving away or toward each other. The arms 114 are connected pivotally by upper pins 118 and lower pins 133 to lower links 122 attached to step links 125 to step 101. If viewed down the axis of pins 118 and 133, there is a trapezoidal shape (see FIG. 20) between the 104 pin axis as the slide trunnions 126 move along upper channels 113 in a linear fashion. In fully deployed lowest position these pins as viewed down their axis now form a rectangular shape, which is the lowest position of the linkage. The limit of travel away from each other is stopped when the bumpers 120 engage to the features on links 122. Links 122 and 125 cannot move linearly with respect to the step 1 due to mechanical attachment via T-nuts and screws 134, 135. As the step is approaching it's stow position 18 when the slide trunnions move toward each other, the bumpers 121 now engage pad surface 136 on step links 125 causing a pivoting rotation about pin 123 axis. This results in the step tilting up approximately 15 degrees as it finally stows. This is extremely important to close the gap between step 101 and the body sill area in order to not create an unsightly gap important to styling features typically sought after for running board position on a vehicle between the step upper surface and outer rocker panel sheet metal.

Figure 20:
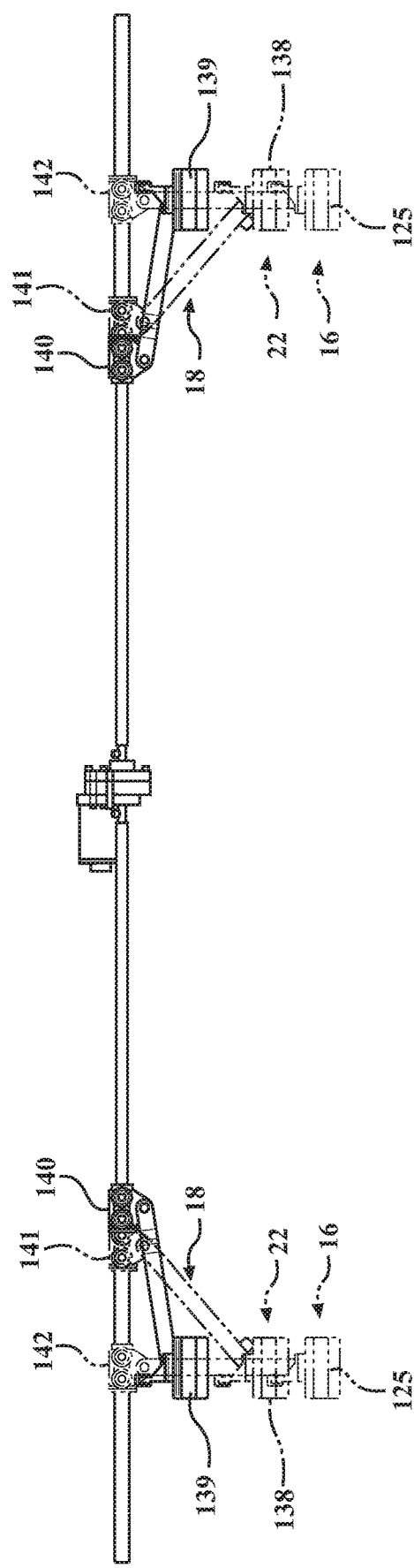

Referring now to FIG. 20 There is shown the positions of the slide trunnions 126 and link for the step in the stow position 18 (140,139), in the mid (variable) position 22 (141,138) and fully deployed position 16 (142,125). The step can be infinitely variable between the stow 18 and fully deployed positions 16.

This invention features an infinitely controllable and programmable mid intermediate position 122 of the step height between the deployed lowest position and the stow position. The invention includes a tunable tilting action of the step as it reaches the stow position. This is critical to meet typical styling requirements for a "flush or integrated" look of the running board to the vehicle. The "mid position" is controllable by means of the ECM 130 that monitors revolutions counts of the motor thereby controlling the mid stopped position. This could be either programmable by the customer or the manufacturer. A preset position or programmed position could be stored in memory and recalled by a key fob or instrument panel selection. For example, a "his and hers" key fob would automatically recall and stored settings for the mid position to best suit the driver's height and physical ability to step into a vehicle. Another important feature of the invention is the self-locking feature between the lead series and lead nuts such that the step maintains its position when stopped without the use of additional brakes which would add cost and complexity to the overall product. The linear motion of the step as it rises or lowers is smooth so noise, vibration and harshness (NVH) in the vehicle is more easily managed. The overall mechanical efficiency of the lead screws with plastic lead nuts is a low friction design which requires less power and resulting in a smaller less expensive motor.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An adjustable position automated running board step comprising: a step member attached to a linkage, the linkage is operable for moving the step from a deployed to a stowed position; and an adjustable linkage which allows adjustable stop points between said stowed and said deployed positions; wherein said step includes a vertical level adjusting lead screw deployable linkage and wherein the step has legs on both sides which are hinged on both ends to said step member to provide a trapezoidal arrangement each of the legs having a threaded end for receiving a rotational threaded actuator bar wherein rotation of the actuator bar moves the threaded end towards or away from each other for moving the step member between a deployed and a stowed position.

2. The adjustable position automated running board step of claim 1 comprising a controller for providing a predetermined stop point between said stowed and said deployed positions.

3. The adjustable position automated running board step of claim 2 further comprising a motor for turning of the rotational threaded actuator.

4. The adjustable position automated running board of claim 1 wherein the adjustable stop points are predetermined saved positions.

5. An adjustable position automated running board step comprising: a step member attached to a linkage, the linkage is operable for moving the step from a deployed to a stowed position; and an adjustable linkage which allows adjustable stop points between said stowed and said deployed positions and further comprising a tunable tilting action of the step as it reaches the stow position.

6. The adjustable position automated running board of claim 5 wherein the stop points are programmed via a linkage into the saved driver positions of the vehicle.

7. The adjustable position automated running board of claim 5 wherein an electronic controller provides at least one adjustable stop point between a fully stowed and fully deployed position.

8. The adjustable position automated running board of claim 7 wherein a plurality of stop points are provided.

9. The adjustable position automated running board of claim 8 wherein a user can pre-program a plurality of predetermined stop points.

10. The adjustable position automated running board of claim 9 wherein said predetermined stop points are selected from a fully stowed position, a fully extended position, at least one intermediate position and combinations of these.

11. An adjustable position automated running board step comprising: a step member attached to a linkage said linkage is operable for moving the step from a deployed to a stowed position and comprises an adjustable lead screw linkage;
- A motor attached to a lead screw of the adjustable lead screw linkage for driving the linkage between a deployed and stowed position; and,
- A controller which controls the motor for controlling movement of the linkage, said controller providing at least one stopping point between said stowed or deployed positions wherein the controller provides a user interface wherein a user can select the stopping point at a user selected position at any point between said deployed and stowed position.

12. The adjustable position automated running board step of claim 11 wherein the stop points of the deployed or the stowed positions are customizable with the controller.

13. The adjustable position automated running board step of claim 11 wherein a user can pre-program a plurality of predetermined stop points.

14. The adjustable position automated running board step of claim 11 wherein the stop points are programmed via a linkage into the saved driver positions of the vehicle.

15. The adjustable position automated running board step of claim 14 wherein the controller is wired into the wiring harness of the vehicle.

16. The adjustable position automated running board step of claim 14 wherein the controller is independent of the wiring harness of the vehicle.

17. An adjustable position automated running board step comprising: a step member attached to a linkage said linkage is operable for moving the step from a deployed to a stowed position and comprises an adjustable lead screw linkage;
- A motor attached to a lead screw of the adjustable lead screw linkage for driving the linkage between a deployed and stowed position; and,
- A controller which controls the motor for controlling movement of the linkage, said controller providing at least one stopping point between said stowed or deployed positions;
    - wherein a slide trunnion and a lead nut is provided to move along the lead screw upon rotation of the lead screw and a stop to the limit of travel is provided by a bumper such that as the step is approaching it's stow position and said trunnion is moving toward the stow position, the bumper now engages a pad surface on a step link causing a pivoting rotation of the step about a longitudinal pin axis which results in the step tilting upward as it stows.

18. The adjustable position automated running board of claim 17 wherein there are left hand and right hand slide trunions lead nuts and bumpers.

* * * * *